US010953568B2

(12) United States Patent
Joutsimo et al.

(10) Patent No.: US 10,953,568 B2
(45) Date of Patent: Mar. 23, 2021

(54) METHOD FOR PRODUCING MDF BOARDS WITH NFC/MFC

(71) Applicant: INVESTIGACIONES FORESTALES BIOFOREST S.A., Concepción (CL)

(72) Inventors: Olli Joutsimo, Lappeenranta (FI); Bruno Gorrini, Concepción (CL)

(73) Assignee: INVESTIGACIONES FORESTALES BIOFOREST S.A., Concepción (CL)

( * ) Notice: Subject to any disclaimer, the term of this patent is extended or adjusted under 35 U.S.C. 154(b) by 688 days.

(21) Appl. No.: 15/556,971

(22) PCT Filed: Mar. 9, 2015

(86) PCT No.: PCT/CL2015/050007
§ 371 (c)(1),
(2) Date: Sep. 8, 2017

(87) PCT Pub. No.: WO2016/141497
PCT Pub. Date: Sep. 15, 2016

(65) Prior Publication Data
US 2018/0169893 A1 Jun. 21, 2018

(51) Int. Cl.
*B27N 3/08* (2006.01)
*B32B 5/02* (2006.01)
(Continued)

(52) U.S. Cl.
CPC ............... *B27N 3/08* (2013.01); *B27N 3/04* (2013.01); *B32B 5/02* (2013.01); *C09J 11/06* (2013.01); *B27N 1/02* (2013.01)

(58) Field of Classification Search
CPC ...................................................... B27N 3/08
See application file for complete search history.

(56) References Cited

U.S. PATENT DOCUMENTS

2006/0144543 A1* 7/2006 Aho .................. H01B 1/12
162/164.6
2008/0075900 A1* 3/2008 Hepworth .......... C08J 5/045
428/35.6
(Continued)

FOREIGN PATENT DOCUMENTS

WO 2009/086141 A2 7/2009
WO 2014/124541 A1 8/2014

OTHER PUBLICATIONS

Veigel, S. et al., "Particle board and oriented strand board prepared with nanocellulose-reinforced adhesive." Journal of Nanomaterials, vol. 2012, Article ID 158503, pp. 1-8, DOI: 10.1155/2012/158503.
(Continued)

*Primary Examiner* — Timothy Kennedy
(74) *Attorney, Agent, or Firm* — Fox Rothschild LLP

(57) ABSTRACT

The invention relates to a method for the production of MDF boards, fibre and particle boards, based on cellulose fibres, comprising the following steps: obtaining wood chips; transporting them to a vaporizer silo where they are heated; transporting the wood chips to a digester where they continue to be heated and are conveyed via a supply outlet screw towards a shredder/refiner; adding a paraffinic emulsion to the chips; transporting them towards the shredder/refiner; injecting resin; carrying to a dryer; transporting towards a fibre silo; carrying the fibres to a step of forming, pre-pressing, pressing, measuring, classification, cooling, standing, formatting and packaging of the boards produced, wherein nanofibrillated cellulose (NFC) is added, together with microfibrillated cellulose (MFC), be it in the supply screw, or after the shredder/refiner, or after the dryer.

36 Claims, 2 Drawing Sheets

(51) Int. Cl.
*B27N 3/04* (2006.01)
*C09J 11/06* (2006.01)
*B27N 1/02* (2006.01)

(56) References Cited

U.S. PATENT DOCUMENTS

| | | | |
|---|---|---|---|
| 2009/0007931 A1* | 1/2009 | Krebs | F26B 5/02 |
| | | | 134/1 |
| 2013/0248760 A1* | 9/2013 | Ampulski | D21B 1/36 |
| | | | 252/183.11 |
| 2015/0033983 A1* | 2/2015 | Bilodeau | B27N 3/04 |
| | | | 106/162.5 |
| 2016/0257814 A1* | 9/2016 | Schade | C08L 1/02 |
| 2016/0296971 A1* | 10/2016 | Hung | B05D 3/0272 |
| 2017/0021525 A1* | 1/2017 | Weinkotz | B27N 3/04 |

OTHER PUBLICATIONS

Liu, C. et al., "Micromechanical properties of hte interphase in cellulose nanofiber-reinforced phenol formaldehyde bondlines." BioResources 2014, 9(3), 5529-5541.

Atta-Obeng, E. et al., "Cellulose reinforcement of phenol formaldehyde: characterization and chemometric elucidation." International Journal of Composite Materials 2013, 3(3), 61-68.

International Search Report issued in the corresponding International application No. PCT/CL2015/050007, dated Jul. 12, 2015.

\* cited by examiner

METHOD FOR PRODUCING MDF BOARDS WITH NFC/MFC

FIELD OF THE INVENTION

The present invention relates to a method of producing medium density fiberboard (MDF) boards, fibre and particle boards with the addition of nanofibrillated cellulose and microfibrillated cellulose (NFC/MFC). Products obtained by the method of the present invention, from microfibrillated and nanofibrillated cellulose fibres have better yield properties and the method has a higher productivity.

STATE OF THE ART

Nanofibrillated and microfibrillated cellulose has interesting properties, such as low density, high chemical reactivity, high resistance, and high transparency (Nogi et al.; 2009; Lee et al., 2009; Pääkk ö et al., 2007; Siro and Plackett, 2001), which has a high potential in industrial applications. In addition, it has been reported that mechanical properties of a wide range of polymers can be improved by means of compound mixtures.

Some studies have been reported which consider the use of nanocellulose in boards to improve its properties, for example Veigel (2012) reports the production of oriented strand boards (OSB) manufactured with urea-formaldehyde (UF) and with the addition of 1% w/w nanocellulose, thus obtaining a reduction in the thickness of swelling, a higher internal bond energy, and an improvement in bending versus OSBs produced only with UF.

US patent application 2010/0285295 A1: "Wood adhesive containing reinforced additives for structural engineering products", relates to the use of nanocellulose (fibrillated nanocellulose (NFC), microfibrillated cellulose (MFC), nanocellulose crystals (NCC)) as additives in adhesives such as UF, polymeric diphenylmethane (pMDI), melamine formaldehyde (MF), phenol-urea-formaldehyde (PUF), melamine-urea-formaldehyde (MUF), melamine-urea-phenol-formaldehyde (MUPF), phenol-melamine-urea-formaldehyde (PMUF), adhesive protein, natural phenolic adhesives, insaturated poly-esthers, and combinations thereof. The adhesive, with the addition of nanocellulose, can be used in structural board products (plywood, laminated veneer lumber (LVL), particle boards, fibre boards, waffle boards, laminated wood beams, structural composed wood, oriented strand boards (OSB), oriented strand lumber (OSL), or parallel strand lumber (PSL). Herein, nanocellulose is used as a resin additive, preparing a mixture of nanocellulose and resin.

US patent application 2011/0293932: "Adhesion with nanocrystalline cellulose", discloses the production of nanocellulose, and its use as an additive in adhesives. It refers to nanocellulose as NCC, and it does not state how the adhesive can be used in the production of boards and/or panels, nor in MDF boards.

US patent application 2011/0201755: "Thermoplastic nanocomposite material based on nanocrystalline cellulose (NCC)", establishes the production of polymeric compounds of NCC-vinyl polymers, to be used as adhesives in medical applications. It does not mention the replacement of UF with nanocellulose in MDF boards, and NCC is exhibited as a source of nanocellulose.

US patent application 2014/0154757 A1: "Processes and apparatus for producing nanocellulose and compositions and products produced therefrom", claims that one of the uses of nanocellulose can be as a rheological modifier. Forsström et al. (2013) and Moon (2014), also mention that nanocellulose can be used to modify the viscosity of different solutions.

However, none of the above patent publications and applications acknowledge that, by the addition and mixing of resin (for example, UF), NFC/MFC and/or filling agents (for example, calcium carbonate, clays, plaster, kaolin, alumina-silicates) and fibres together in the production of fibre for boards and/or panels, the consumption of UF can be reduced, and the properties of boards and/or panels can be improved.

DETAILED DESCRIPTION OF THE INVENTION

Figure 1:
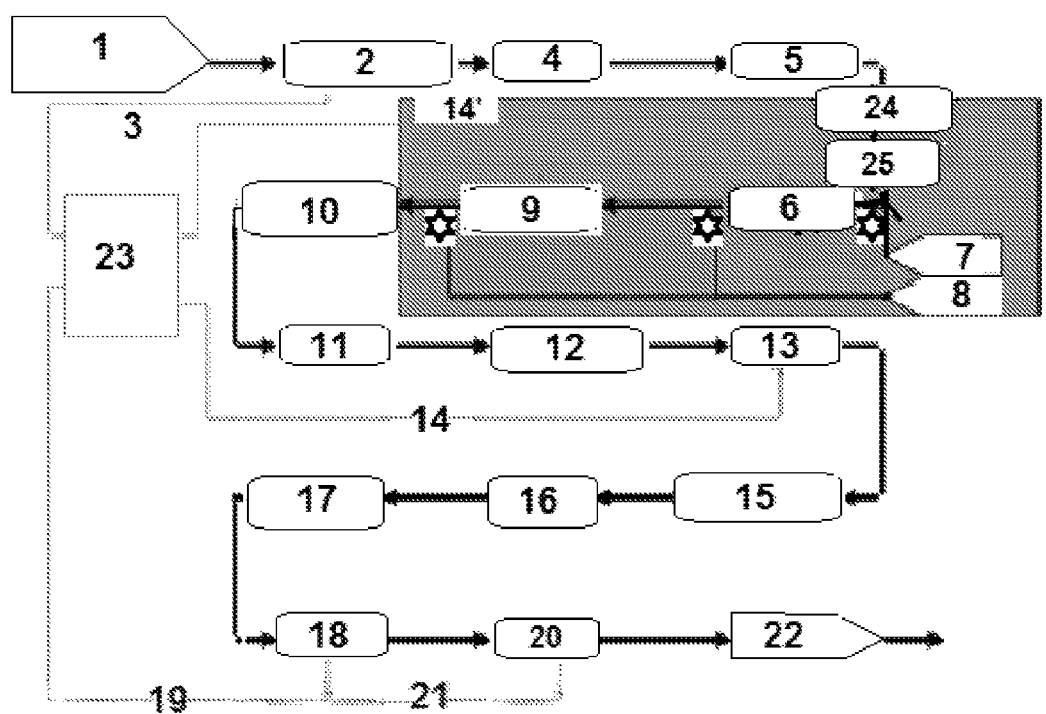
FIG. 1 illustrates the flow chart of the method of the invention for a MDF board production line, and indicates the possible points of addition of the NFC/MFC mixture in the process.

The present invention has surprisingly found that from 0 to 100% of UF resin can be replaced with 0 to 100% NFC/MFC (percentages in weight/weight resin), while the properties of the panels and/or boards are maintained or enhanced. Results may be obtained when NFC/MFC and/or filling agents (for example, calcium carbonate, clays, plaster, kaolin, alumina-silicates) are added together, without a prior mixture with the resin and paraffinic emulsions, to the fibres in the shredding/refinement step, after said step, or after the drying step. This ensures a better mixing of fibres, resin, NFC/MFC, and/or filling agents (for example, calcium carbonate, clays, plaster, kaolin, alumina-silicates). Further, energy requirements in the mixing are reduced, thus obtaining a better mixture.

The manufacture of MDF boards is well described in the literature, and it refers to obtaining wood fibres via a thermomechanical refining process, whereas the manufacturing process of OSBs is by manufacturing strands, without thermomechanical refining.

Document US 2010/0285295, defines cellulose microfibres as particles with a size of between 200 and 1000 mesh, i.e., between 75 and 13 mm, without providing a clear definition of microfibrillated or nanofibrillated cellulose. Still further, examples 1 and 2 of said document used, as additive, cellulose microfibres, commercially obtained from CreaFill Fibres Corp, mixed with resin, having dimensions of 30 mm×18 mm×1-2 mm, differing from NFC/MFC used herein, which is obtained from commercial white pulp, mechanically treated in a refiner, and having a width of less than 100 nm, which is a size much smaller than that used in the US document. On the other hand, in examples 3 and 5 of the document, microcellulose fibres are mixed with mineral nanoparticles and are treated with ultrasound, and are later mechanically combined with the resin, which differs from the way of adding NFC/MFC of the present invention, since there is no mixture of resin and NFC/MFC prior to entering the steps of the process.

The process consists in processing the wood 1, in a debarker 2, which provides wood chips 4 to the board and/or panel production plant, and bark 3 to the energy production center 23.

Wood chips 4 are sent to cleaning and classification processes to remove the remaining of bark and sand. Chips go to the chip washing station 5 where they are freed from materials whose density prevents them from floating, mainly sand and metals. Via a drain screw, clean chips are carried to a steaming bin 24.

In the steaming bin 24, occluded air in the chips is removed, which renders the subsequent process of heat transfer in the digester 25 more effective. At the silo, chips are heated with saturated vapor at a pressure of 3 bar with the object of standardizing temperature, standardizing humidity, and softening the chips, thus rendering the removal of water and natural resins from the wood more effective. From the steaming bin they advance to the digester 25.

The digester 25 consists of a vertical, variable-diameter tube wherein chips are heated via saturated vapor at a pressure of 7 to 9 bar, for a holding period of 2 to 7 minutes. Vapor flow, pressure and temperature are automatically monitored. A variable-speed supply output screw at the bottom of the digester determines the flow volume of the material to the shredder/refiner 6.

A paraffinic or wax emulsion 7 is injected in the supply screw, and is properly mixed with the fibre during the refinement process, or it can otherwise be injected in the blowing line.

Chips are conveyed to a supply screw towards the shredder/refiner 6, where, as its name suggests, the material is shredded, refined and fibres and chips are set apart. The shredder casing has two cut discs. One disc is stationary, the other one is rotary. The distance between the stationary and the rotary discs in the shredder body produces the higher impact in energy consumption during refining. Chips are introduced through the center of the stationary disc, and a centrifugal force forces them to enter through the narrow opening located between the discs. Vapor pressure in the disc casing blows the fibre through an adjustable blowing valve, mounted on the shredder casing, and subsequently through a blowing line towards the drying duct.

Part of the vapor generated by the process, in an energy station 23, is transferred back to the upper portion of the shredder/defibrator through a vapor return piping 14'.

The adhesive is prepared by mixing different components, such as resins, urea solution, catalyst (if present), colorants, filling agents, etc., water at a certain weight ratio, generally with a consistency of 50-80% by weight of resin, the rest being water; preferably 65% by weight of resin, the rest being water. Resin 8 is stored in tanks from where it is pumped towards the mixing unit near the shredder/refiner 6. It can be injected at the input (not shown in FIG. 1) or the output of the shredder/refiner 6 or at the output of dryer 9, if the process is dry blending.

Drying is carried out in a one- or two-phase dryer 9, and the heat source used consists of hot gasses 14' or hot air coming from the thermal plant via pipes where it is mixed with fresh air to control the temperature. Fibre-vapor mixture coming from the shredder/refiner 6 is pushed towards the drying duct 9. The hot air current evaporates humidity and leads the fibre to dryer cyclones, where the dry fibre is set apart from the drying gas. Wet gas is ejected towards the upper portion of the cyclone. The fibre is conveyed to the fibre silo 10.

Dried fibres from the dryer 9, recycle fibres from the forming machine 11, and fibres from the forming line and cleaning systems arrive at the fibre silo 10.

Fibre silo 10 acts as a small storage lung between the fibre preparation area and the blanket forming line, feeding the press 13. It maintains a constant flow of fibre towards the forming station, and it also ensures that the different types of fibres fed to the deposit are homogeneously mixed prior to entering the forming process.

A variable speed conveyor, located at the bottom of the silo 10, controls the amount of fibres transported towards the forming machine 11.

A pneumatic separator (not shown in the figure) specially designed to separate and remove high-density particles such as, for example, adhesive clusters, fibre knots, metal, etc., is located in the fibre discharge end 10 of the silo. Here, the amount of lower-quality material travelling to the fibre flow towards the formation step is minimized. Fibre coming from the fibre deposit is conveyed towards this unit by an air current, and then towards the forming station.

Fibre coming from the fibre silo 10 is introduced within a formation head 11, whether via blow-molding, or mechanical formation generating a continuous mat, of different height depending on the desired thickness and density of the board to be manufactured.

Subsequently, this mat goes through a pre-pressing process 12. The objective of pre-pressing is mainly to reduce the height of the mattress to deliver a greater stability to the mat and decrease pressing time.

Subsequently, there is a pressing process 13, whether via multi-plate press or continuous press. In this step, the board consolidation process is performed, by applying pressure and temperature, for a certain period of time, depending on the density of the board, thickness, and other process conditions.

The pressed board goes through different work stations, where it is subjected to operations of measurement 15, classification, cooling 16, storage 17 following cooling, sanding 18, formatting 20 and packaging 22. Here, cuttings from formatting 21 and sander dusts 19, serve as feed for the energy center 23.

NFC/MFC mixture can be added at the output of the digester 25, in the supply screw to the shredder/refiner 6, after the output from the shredder/refiner, namely a blowing line 6; at this point, one or more filling agents can be added to the fibres together with the NFC/MFC mixture, or at the output of dryer 9; at this point, filling agents together with resin can also be added to the fibres together with the NFC/MFC mixture, or the fibre blanket can be sprayed with a low-consistency mixture of NFC/MFC (addition points are indicated with a star in the figure). Resin is not previously mixed with NFC/MFC rather it is added separately to the board production process. NFC/MFC addition can range from 0.5 to 50% (by weight of nanocellulose/weight of dried resin), preferably 1 to 30%.

Resins used are mainly UF and MUF in amounts ranging from 5 to 25% by weight of resin in dry basis of wood fibres (resin/water). For UF specifically, U/F molar rations range from 0.4 to 1.4, with a solids content of 40 to 65%, strengthened with melamine (from 0.3 to 7% by weight of melamine) or not, and with viscosities ranging from 100 to 500 cps.

Optionally, catalysts can be used in the process, such as ammonium sulfate, ammonium chloride, or ammonium nitrate, for the amina-based resin; which are added after mixing with the adhesive mixture. Catalyst concentrations range from 0.1 to 5% by dry weight to resin dry basis.

Filling agents used are calcium carbonate, clays, plaster, kaolin, alumina-silicates, with calcium carbonate being preferred. Concentrations of these agents range from 1 to 100% by weight, their dosage in the process being from 1 to 30% by weight to resin.

APPLICATION EXAMPLES

Manufacturing conditions of the boards were as follows:
U/F resin molar ratio: 0.95%
melamine in the resin: 1% dry basis
Press temperature: 180° C.

2 0% resin in the board: 20% dry basis
Pressing time: 2 min 45 sec, which equals a pressing factor of 10.3 sec/mm.
Density of boards: 500-540 kg/m$^3$.

Example 1

Figure 2:
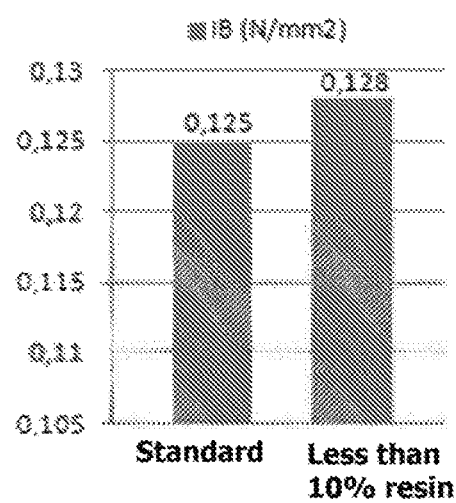
FIG. 2 shows a chart with IB values for boards with replacement of 10% resin with 0.1% of NFC/MFC and without the addition of NFC/MFC.

Two types of MDF boards were prepared to laboratory scale, according to the method of the invention:
A standard board with a load of 20% resin (dry weight/dry weight).
A board with 10% less resin than the standard board, and with an addition of 1% NFC/MFC to resin.
Nanocellulose used in the board was that produced from bleached Kraft pulp treated in a mill.
Both boards use 1,215 gr. fibre, the standard board uses 121.5 gr UF resin, whereas the nanocellulose board uses 109.4 gr. UF resin (10% less of resin) and 1.09 gr. NFC/MFC solid.
In both cases, fibres were sprayed with the corresponding resins (standard and mixture of resin and NFC/MFC), forming a fibre blanket and pressed to 180° C. for 4.5 minutes.
FIG. 2 shows the results for internal bond (IB), which measures board and/or panel consolidation, obtained for each board. The inventive board (with 10% less resin, replaced with a mixture of NFC/MFC), has an IB of 0.128 N/mm$^2$ and the standard board has an IB of 0.125 N/mm$^2$. This proves that IB values are similar but a smaller amount of resin is used in the production of boards.

Example 2

In example 2, 10% and 20% of resin is replaced with respective amounts of NFC/MFC of 0%, 1%, 2%, measuring the effect on IB of each board.
In this example, 3 MDF boards were prepared to laboratory scale, according to the method of the invention:
A standard board with a density of 500 kg/m$^3$.
A board with 10% less resin than the standard board, and with an addition of 1% NFC/MFC to resin.
A board with 20% less resin than the standard board, and with an addition of 2% NFC/MFC to resin.
Nanocellulose used in the boards was that produced from bleached Kraft pulp treated in a mill.
When preparing the boards, these had 835.7 gr of fibres, the standard board used 313.6 gr of UF resin and 3.1 gr catalyst. The board with 1% nanocellulose used 282.2 gr. UF resin (10% less resin), 2.04 gr. NFC/MFC and 2.8 gr. catalyst. In turn, the board with 2% nanocellulose used 250.8 gr. UF resin (20% less resin), 4.07 gr. NFC/MFC and 2.4 gr. catalyst.
All fibres were sprayed with the corresponding mixtures, forming a fibre blanket and pressed to 180° C. for 4.5 minutes.
Catalyst used in this example was ammonium sulfate.

TABLE 1

| Dry resin | % replacement | Density (kg/m$^3$) | IB (N/mm$^2$) |
|---|---|---|---|
| Standard | — | 523 | 0.156 |
| 10% less resin | 1 | 530 | 0.181 |
| 20% less resin | 2 | 533 | 0.234 |

Example 2, shows IB increases from 0.156 N/mm$^2$ to 0.234 N/mm$^2$, when 20% resin is replaced with 2% NFC/MFC. The higher the IB, the more consolidation and better behavior boards/panels show when subjected to screw, millability, and durability.

Example 3

Example 3 shows the addition of fillers such as calcium carbonate, clays, plaster, kaolin, and alumina-silicates, together with NFC/MFC to reduce even further the use of resins in the production of MDF boards.
Wood fibres and UF resin are used in the production of 2 different types of MDF boards to laboratory scale.
A standard board with 100% UF resin and a density of 500 kg/m$^3$.
A board with 10% less resin than the standard board and with an addition of 1% NFC/MFC to resin, and 1% powdered calcium carbonate (PCC).
Nanocellulose used in the board was that produced from bleached Kraft pulp treated in a mill.
In both cases fibres were sprayed with the corresponding resins (standard and mixture of NFC/MFC with PCC and resin), forming a fibre blanket and pressed to 180° C. for 4.5 minutes.
IB results are shown in Table 2 below:

TABLE 2

| Condition | IB (N/mm$^2$) |
|---|---|
| 100% resin | 0.204 |
| 1% NFC + 1% PCC + 80% resin | 0.286 |

Table 2 shows IB values for produced boards. When 1% filling agent is also added besides 1% NFC/MFC, and only 80% UF resin is maintained, there is an increase in IB values from 0.204 N/mm$^2$ to 0.286 N/mm$^2$.

ADVANTAGES OF THE INVENTION

The present invention reduces the amount of UF resin used in the production of MDF boards, thus obtaining MDF boards with a higher IB to that obtained from the production without the addition of NFC/MFC.

The invention claimed is:
1. Method for producing MDF boards and fiber boards from cellulose fibers comprising the following steps:
a) obtaining wood chips and transporting them to a cleaning and classification process where they are washed;
b) transporting the cleaned chips to a steaming bin silo where they are heated;
c) transporting the chips from step (b) to a digester where they are further heated and conveyed via a supply outlet screw towards a shredder;
d) adding a wax emulsion or melted wax to said supply outlet screw towards the shredder or to a blowing line at an output of shredder towards a dryer;
e) transporting the chips from step (c) and wax emulsion to the shredder where they are mixed and the material is shredded to generate fibers from the shredder;
f) injecting resin in a blow line located at an input of the shredder or at the output of the shredder or at the output of the dryer;
g) carrying the mixture to the dryer, where water is evaporated and fibers from step (e) are dried;

h) transporting the dry fibers from step (g) to a fiber silo, which also receives fibers from different parts of the method where the fibers are stored and homogeneously mixed;

i) producing MDF boards or fiber boards leading the homogeneous fibers to a forming, pre-pressing, pressing, measuring, classification, cooling, sanding, and formatting and packaging step of the obtained board (MDF board or fiber board), wherein nanofibrillated cellulose (NFC) is added together with microfibrillated cellulose (MFC) at the supply outlet screw of step c), or at the output of the shredder of step e), or at the output of the dryer of step g).

2. Method according to claim 1, wherein the obtaining of chips is carried out by supplying wood to a debarker.

3. Method according to claim 1, wherein the resin used can be urea-formaldehyde (UF) or melamine-urea-formaldehyde (MUF) resin.

4. Method according to claim 3, wherein the resin used is urea formaldehyde resin.

5. Method according to claim 1, wherein the amount of resin used ranges from 5 to 25% by weight of resin in a dry basis of wood fiber, and having a concentration of 45 to 70% by weight of resin, the rest being water.

6. Method according to claim 4, wherein U/F molar ratios range from 0.4 to 1.4, solids content ranges from 40 to 65% by weight, and viscosity ranges from 100 to 500 cps.

7. Method according to claim 3, wherein when the resin is a MUF resin, the melamine content ranges from 0.3% to 17% by weight of melamine.

8. Method according to claim 1, wherein the NFC/MFC concentrations range from 0.5 to 50% by weight of nanocellulose/weight of dry resin.

9. Method according to claim 8, wherein concentrations of NFC/MFC range from 1 to 30% by weight of nanocellulose/weight of dry resin.

10. Method according to claim 1, wherein the NFC/MFC is added at the supply outlet screw of step (c).

11. Method according to claim 1, wherein the NFC/MFC is added after the shredder of step (e).

12. Method according to claim 1, wherein the NFC/MFC is added after the dryer of step (g).

13. Method according to claim 1, wherein the wax emulsion or melted wax is injected to said supply outlet screw.

14. Method according to claim 1, wherein the wax emulsion or melted wax is injected at the blowing line from the shredder to the dryer.

15. Method according to claim 1, wherein the resin is injected at the input of the shredder.

16. Method according to claim 1, wherein the resin is injected at the output of the shredder.

17. Method according to claim 1, wherein the resin is injected at the output of the dryer.

18. Method according to claim 1, wherein heating of chips of step (b) is performed at 3 bar, with saturated vapor.

19. Method according to claim 1, wherein the digester in step (c) is a vertical tube wherein chips are further heated with saturated vapor at 7 to 9 bar, for a period of 2 to 7 minutes.

20. Method according to claim 1, wherein the dryer in step (g) comprises one step, and the heat source used consists of hot gasses or hot air coming from the energy station through pipes where it is mixed with fresh air to control the temperature.

21. Method according to claim 1, wherein the dryer in step (g) comprises two steps, and the heat source used consists of hot gasses or hot air coming from the energy station through pipes where it is mixed with fresh air to control the temperature.

22. Method according to claim 1, wherein the forming step of step (i) is performed via blow-molding, generating a continuous mat.

23. Method according to claim 1, wherein the forming step of step (i) is performed via mechanical formation, generating a continuous mat.

24. Method according to claim 1, wherein at the pre-pressing step of step (i), the height of the mat is reduced.

25. Method according to claim 1, wherein the pressing step of step (i) is performed in a multi-plate press.

26. Method according to claim 1, wherein the pressing step of step (i) is performed in a continuous press.

27. Method according to claim 1, wherein optionally a catalyst is injected in step (f) separately to the resin.

28. Method according to claim 1, wherein optionally a catalyst is injected in step (f) together with the resin.

29. Method according to claim 27, wherein the catalyst is selected from ammonium sulfate, ammonium chloride, or ammonium nitrate.

30. Method according to claim 28, wherein the catalyst is selected from ammonium sulfate, ammonium chloride, or ammonium nitrate.

31. Method according to claim 27, wherein the concentration of the catalyst range from 0.1 to 5% by dry weight to dry basis resin.

32. Method according to claim 28, wherein the concentration of the catalyst range from 0.1 to 5% by dry weight to dry basis resin.

33. Method according to claim 1, wherein optionally together with the NFC/MFC mixture, one or more filling agents are added.

34. Method according to claim 33, wherein the filling agent is selected from the group consisting of: calcium carbonate, clays, plaster, kaolin, and alumina-silicates.

35. Method according to claim 34, wherein the filling agent is calcium carbonate.

36. Method according to claim 33, wherein the concentration of filling agent ranges from 1 to 100% by weight, being dosed in the range of 1 to 30% by weight to resin.

* * * * *